United States Patent [19]

Dobson

[11] Patent Number: 4,780,721

[45] Date of Patent: Oct. 25, 1988

[54] ADAPTIVE ANTENNA ARRAY

[75] Inventor: Robin Dobson, Modbury Heights, Australia

[73] Assignee: The Commonwealth of Australia, Canberra, Australia

[21] Appl. No.: 849,457

[22] PCT Filed: Jul. 18, 1985

[86] PCT No.: PCT/AU85/00157
  § 371 Date: Mar. 21, 1986
  § 102(e) Date: Mar. 21, 1986

[87] PCT Pub. No.: WO86/01057
  PCT Pub. Date: Feb. 13, 1986

[30] Foreign Application Priority Data

Jul. 23, 1984 [AU] Australia ............... PG6170

[51] Int. Cl.[4] ............................................. G01S 3/38
[52] U.S. Cl. .................................... 342/178; 342/383
[58] Field of Search ............... 342/378, 379, 380, 383, 342/386

[56] References Cited

U.S. PATENT DOCUMENTS

| | | |
|---|---|---|
| 3,876,947 | 4/1975 | Giraudon. |
| 4,079,379 | 3/1978 | Piesinger. |
| 4,079,380 | 3/1978 | Esry. |
| 4,079,381 | 3/1978 | Piesinger. |
| 4,105,977 | 8/1978 | Fitting. |
| 4,146,889 | 3/1979 | Brennan et al.. |
| 4,214,244 | 7/1980 | McKay. |
| 4,298,873 | 11/1981 | Roberts. |
| 4,298,874 | 11/1981 | Kuipers ............................. 342/386 |
| 4,347,627 | 8/1982 | Alter. |
| 4,398,197 | 8/1983 | Dillard ............................. 342/379 |
| 4,528,674 | 7/1985 | Sweeney et al. ............. 342/378 |

OTHER PUBLICATIONS

Introduction to Adaptive Arrays; Robert A. Monzingo and Thomas W. Miller; pp. 364-377.
Cascade Preprocessors for Adaptive Antennas; Warren D. White; pp. 670-684.
IEE Processings, vol. 131, Pt. F, No. 6, Oct. 1984, C. R. Ward et al, "Application of a Systolic Array to Adaptive Beam Forming".

*Primary Examiner*—Theodore M. Blum
*Assistant Examiner*—Mark Hellner
*Attorney, Agent, or Firm*—Cushman, Darby & Cushman

[57] ABSTRACT

A method and device for removing undesired jammer signals from desired signals which comprises forming a beam on the desired signal in an adaptive antenna array characterized by an orthogonalizer array (12) to receive digitized signals from the antennas, and pass signals to a beamforming array (14) and including a late jammer canceller array (16) and an intelligent controller (24) arranged to control weights (W) and select a row having the desired beamformed signal.

18 Claims, 8 Drawing Sheets

SYSTEM FUNCTIONAL BLOCK DIAGRAM

GRAM-SCHMIDT ORTHOGONALIZER

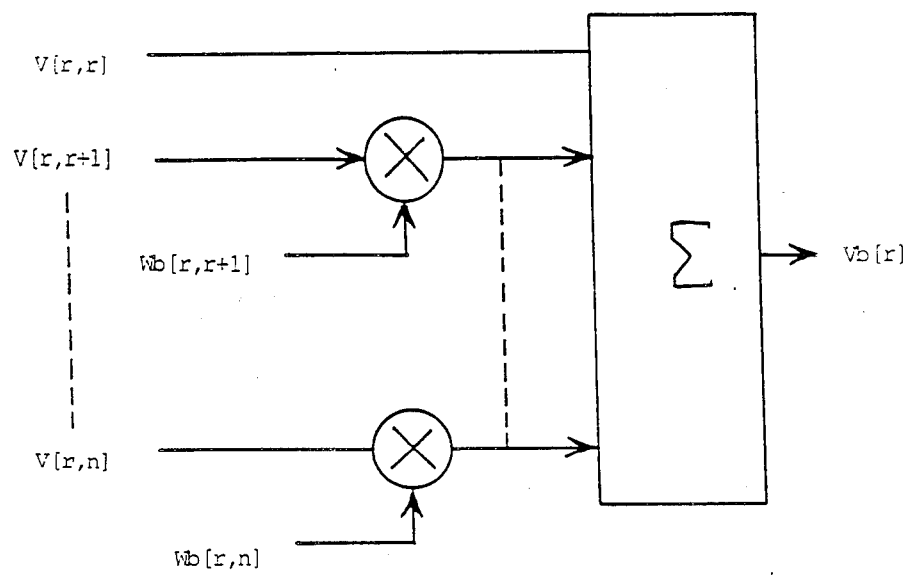
FIG. 4 BEAMFORMING CIRCUIT
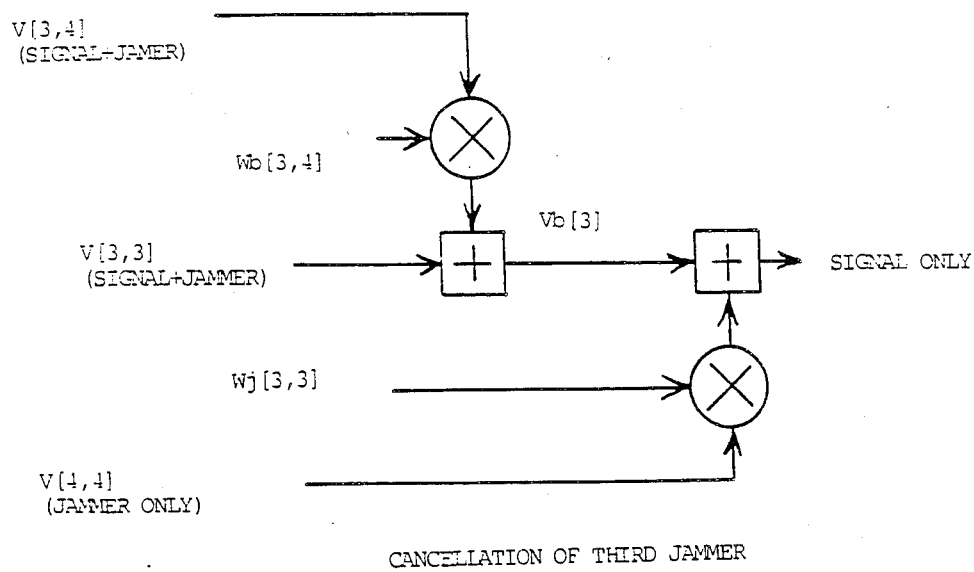
FIG. 5 CANCELLATION OF THIRD JAMMER

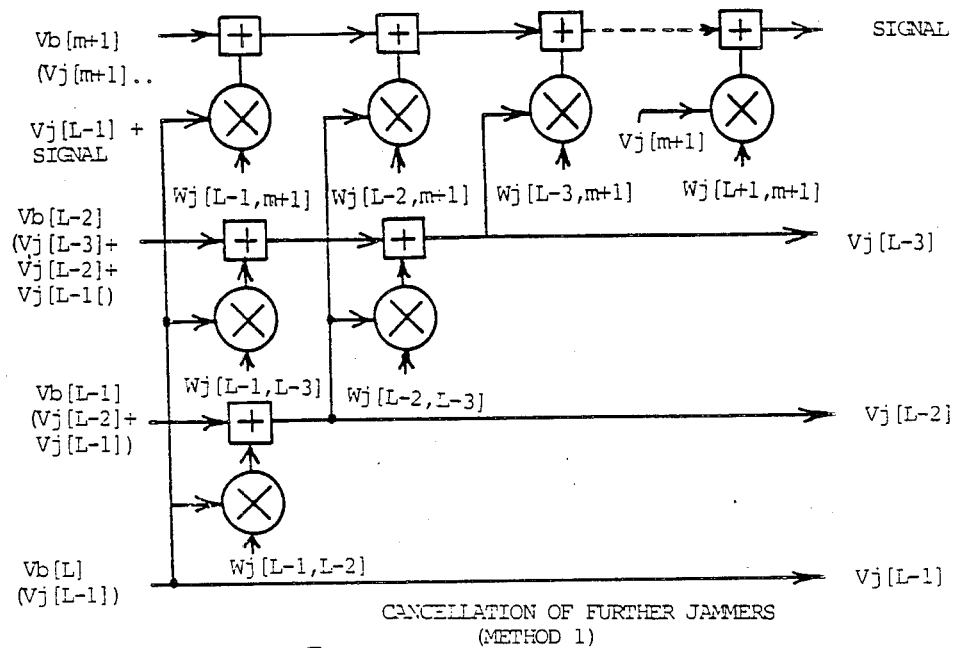
FIG. 6  CANCELLATION OF FURTHER JAMMERS (METHOD 1)
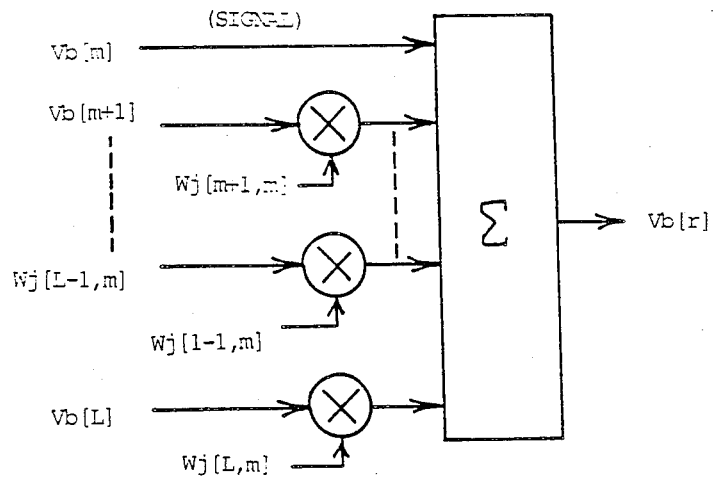
FIG. 7  CANCELLATION OF FURTHER JAMES (METHOD 2)

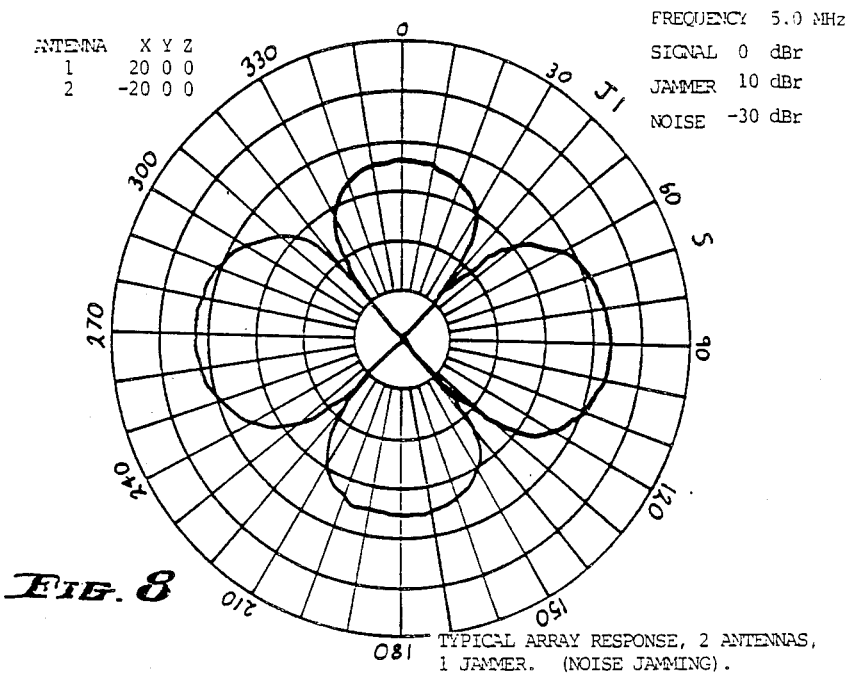
FIG. 8 TYPICAL ARRAY RESPONSE, 2 ANTENNAS, 1 JAMMER. (NOISE JAMMING).
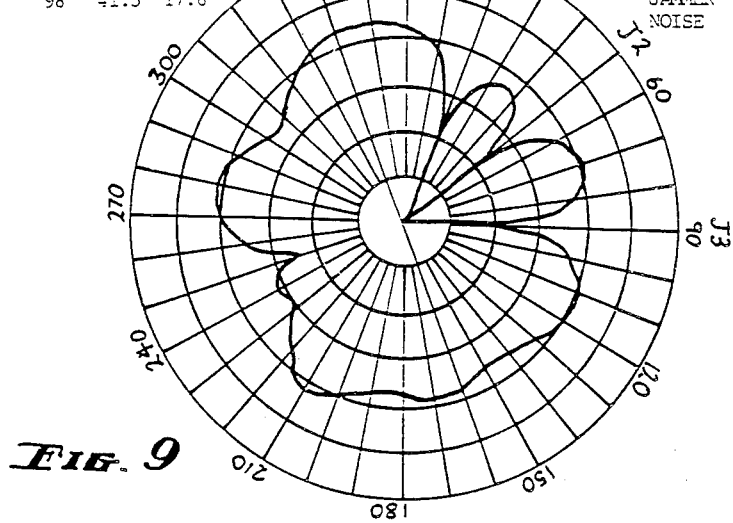
FIG. 9 TYPICAL ARRAY RESPONSE, 4 ANTENNAS, 3 JAMMERS. (NOISE JAMMING)

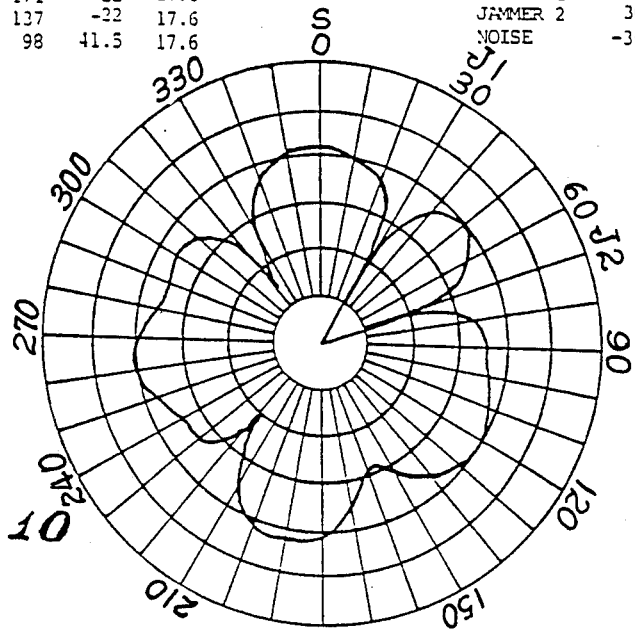
FIG. 10 — RESPONSE SHOWING 2 NULLS AND 1 BEAM (0° Az) (5 ITERATIONS)
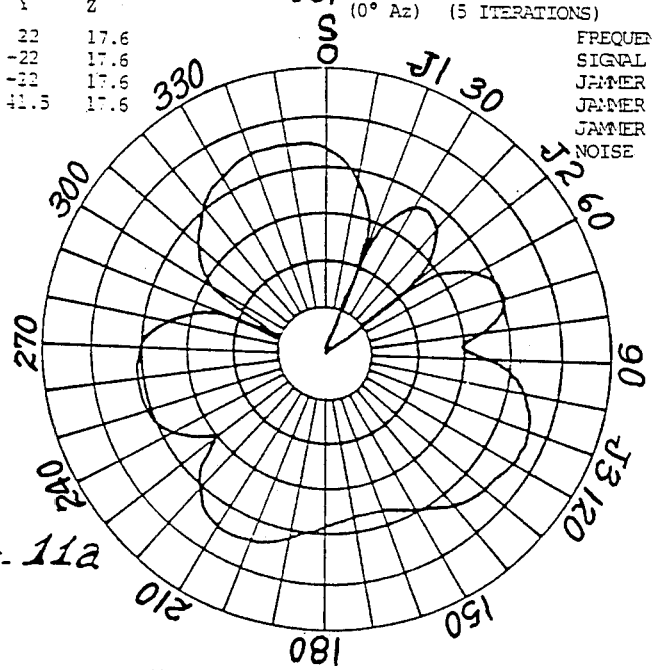
FIG. 11a — ARRAY RESPONSE WITH JAMMER J1 and J2 ON AND J3 OFF

ARRAY RESPONSE 100 ITERATIONS AFTER JAMMER 3 TURNED ON (DESIRED SIGNAL PRESENT)

ADAPTIVE ANTENNA ARRAY

GENERAL PURPOSE

The general purpose of this invention is to permit directional interference sources (atmospheric noise, other users etc.) to be removed from received communications signals, while maximizing the desired signal through the use of an adaptive antenna array.

BACKGROUND

The present invention relates generally to the field of adaptive antenna array processors for use in adaptive antenna array systems that remove undesired signals from the received signal and at the same time maximize the signal-to-noise ratio by forming a beam on the desired signal.

In omnidirectional high-frequency communication systems, undesired interfering signals from various localized sources lying in various directions can be received along with the desired signals. If these signals are powerful enough, they can seriously degrade performance. The effect of these interfering signals can be reduced or negated by employing an adaptive antenna array. An adaptive antenna array utilizes at least two antennas hereafter referred to as antenna elements, with a receiving system. By appropriately weighting and summing the outputs of the signals received by these antenna elements, the interfering signals can in general be reduced or cancelled.

Typically, these prior art adaptive antenna arrays required a large number of samples to be taken before a null could be formed on an interfering signal, and a beam formed on the desired signal. Also, they could not null an interfering signal without also nulling the desired signal unless either the signal contained a reference identifier, or else the direction of the signal was known.

The use of adaptive spatial nulling techniques to remove undesired signals from desired signals has been established for many years in both the radar and communications fields. See for example, Monzingo and Miller, "Introduction to Adaptive Antenna Arrays", John Wiley and Sons, 1981.

SUMMARY OF THE INVENTION

The present invention is a digital adaptive antenna array processor which does not require either the direction of the desired signal to be known, or the desired signal to contain any special reference pattern or spreading code to be continuously present. Instead, the present invention relies merely on a knowledge of the time when the desired signal is not present. Waveforms which have a known "time-out" are found in Time Division Multiple access systems, frequency hopping systems and polling or "roll call" systems. The present invention partitions the optimization problems of formation of nulls and beams and the identification of individual interference sources by the monitoring of individual nodes of the array processor, and dynamically reconfigures the array processor to meet the changing environment. The present invention not only reduces or eliminates atmospheric and other-user interference, but also counters sophisticated pulse jamming techniques, generally in one sample.

In accordance with the present invention the in-phase and quadrature baseband signals derived from the output of each antenna in the array are digitized in analogue-to-digital converters and the inputs to the present invention are these digitized baseband components. The baseband components can be obtained, for example, as described in Nathanson, "Radar Design Principles", McGraw Hill, New York, 1969, page 472.

These digitized samples are then processed in a digital signal processor which performs linear algebraic operations on the incoming data. By performing orthogonalization operations on the outputs of two antennas, a complex weight can be determined which, when multiplied by the output of the first antenna and the resultant added to the output of the second antenna, will cause a directional interference source to be minimised in the resultant.

By monitoring each of the orthogonalizer nodes with an intelligent controller, sufficient information can be obtained to make this algorithm superior to others for any communication system which has a known time period in which the transmitter is not transmitting. For example, the number of interference sources can be determined, the optimum row at which the signal can be beamformed on can be determined, an interference source can be removed without removing the desired signal even though there is no identifier on the desired signal at the time, and the presence and strategy of sophisticated pulse jamming can be determined and coutered.

This new system is superior to other implementations in that it can form nulls and beams at a faster rate than other implementations. Nulls can be formed at the rate of one per array sample and a beam can form on the desired signal in only one array sample. This new invention can also form a null on an interference source (albeit more slowly) while the desired signal is present, without nulling the signal, even though the signal contains no reference "identifier" at the time. Further the architecture permits the monitoring of all of the nodes in the array processor from which an optimized processor configuration can be determined.

This feature permits individual pulse jammers to be identified by a one sample estimate of the orthogonalizer complex weight for that sample, and also permits these weights to be averaged over many samples to speed the formation of nulls when the desired signal is present.

Thus the invention consists in the method and the means for removing undesired jammer signals from desired signals and maximising the signal-to-noise ratio by forming a beam on the desired signal in adaptive antenna arrays in which rows of orthogonal processors are used, characterised by digitising the signals from each antenna in the array, nulling directional interference jammers during the absence of the desired signal, first nulling then beamforming on the desired signal when present after such nulling, and nulling any further jammers not present in the original nulling.

The means comprises an adaptive antenna array arranged to receive a desired signal without it being degraded by interference noise, the means comprising digital-to-analogue converters arranged to digitise the baseband signals derived from the output of each antenna in the array and means to orthogonalise the output therefrom, characterised by means to determine when a desired signal is present, means to null interference jammers during the absence of the desired signal, the means to first null, then beamform on the desired signal when present and means to null any further jammers not present in the original nulling.

A feature of the invention is an intelligent controller which monitors each of the nodes in the orthogonalizer tree. This permits the number of directional interference jammers or noise sources to be determined, the row at which the nulling operation should stop, the row at which the desired signal should be beamformed on, and the presence of further interference sources which can then be nulled.

Further, by keeping statisitics on the instantaneous weights formed in the rows below the row at which the signal is extracted, different pulse jammers can be immediately identified by a one sample weight formation, and providing that sufficient statistics have been collected, may be instantly nulled.

In the following description, all directional interference sources, whether atmospheric, other-user, or deliberate, are generically referred to as "jammers".

The orthogonalizer tree of this scheme may be implemented in an analogue form using Howells-Applebaum loops as described in Gabriel W. F. "Adaptive Arrays—An Introduction" Proc. IEEE, Vol. 64, February 1976. pp 239–272. In this case the voltages at each node would need to be digitized in an analogue-to-digital converter and then fed to the intelligent controller.

The orthogonalizer tree may also be implemented by using real orthogonalizing weights at each node as described by Dillard G. M. "Digital Sidelobe Canceller with Real Weights" application for Letters Patent. Navy Case 65,495. The remainder of the system would be identical to the system described.

The orthogonalizer tree could also be implemented by using tapped delay lines rather than using the inphase (I) and quadrature (Q) channel, as described by W. E. RODGERS and R. T. COMPTON "Adaptive Array Bandwidth with TAPPED Delay-Lime Processing" IEEE, Trans. Aerospace and Electronic Systems Vol AES-15, No. 1 January, 1979 at each node in the orthogonalizer tree.

To enable the nature of the invention to be fully understood reference will be made to the accompanying drawings in which:

FIG. 1 shows a basic system function diagram,

FIG. 2 shows a similar diagram in more detail of a preferred form, showing how an intelligent controller receives I and Q values from nodes in the circuit and sends separate weight values to each point W but the signals could be obtained from tapped delay lines, which would require weights for each tap, FIG. 3 shows a Gram-Schmidt Orthogonalizer, FIG. 4 shows a typical beam-forming circuit, FIG. 5 shows diagramatically cancellation of a third jammer, FIG. 6 shows a first method of cancellation of further jammers, FIG. 7 shows a second method of cancellation of further jammers, FIG. 8 shows a typical array response, 2 antennas, 1 jammer, (NOISE JAMMING), FIG. 9 shows a typical array response, 4 antennas, 3 jammers, (NOISE JAMMING), FIG. 10 shows a response showing 2 nulls and 1 beam (0 Az), FIG. 11a shows an array response with jammer J1 and J2 on and J3 off, FIG. 11b shows the array response 100 iterations after Jammer 3 turned on (desired signal present).

DESCRIPTION OF THE PREFERRED EMBODIMENT

Most of the existing array adaption algorithms are vulnerable to sophisticated jamming techniques. For example "blinking" jammers, which are spatially separated and in which each takes turns in jamming for a short period, can cause serious problems to the adaption process. This strategy causes the cross correlation between the antenna outputs to rapidly change, and as a consequence the algorithm may never converge.

PRINCIPLE OF OPERATION

There are 3 distinct phases in this algorithm, the formation of initial nulls on directional interference with the desired signal absent, the formation of a beam on the desired signal once it is present, and the formation of further nulls on any other directional interference, such as pulse jammers, bolts of lightning etc., which may appear after the initial nulls have been formed.

NULL FORMATION

Figure 3:
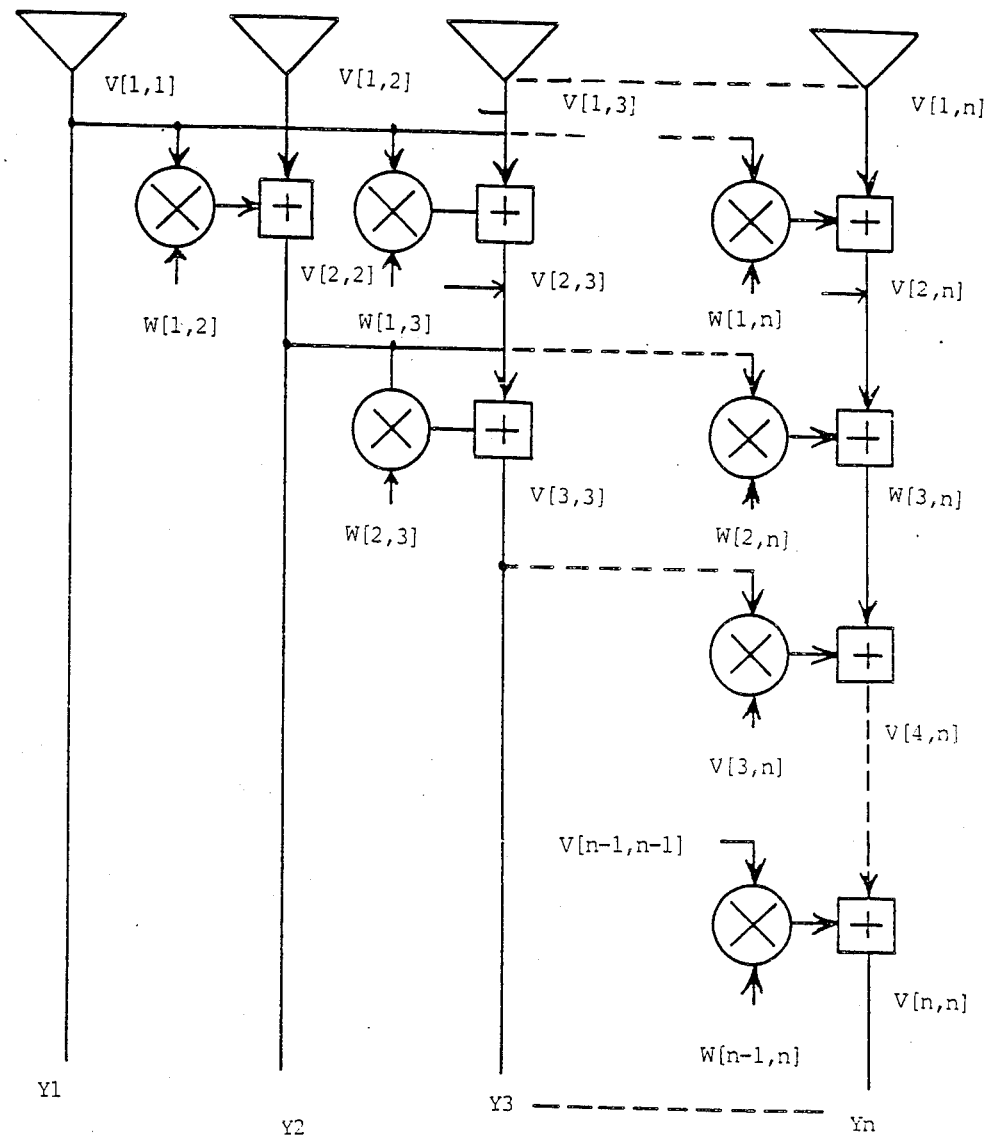

The Gram-Schmidt orthogonalizer, shown in FIG. 3 operates by taking the output of the first antenna and orthogonalizing it with each of the outputs of the second antenna, the third antenna and so on until the n-th antenna. Thus the outputs of the first row orthogonalizers are all orthogonal with the outputs of antenna 1. The output of one of these first row orthogonalizers, (V[2,2] in this case) is then orthogonalized with every other output in that row, and so on until the final row is orthogonalized. The resultant outputs Y1 to Yn are then all orthogonal to each other. This structure may be used as an array pre-processor, see MONZINGO R. A. and MILLER T. W. "INTRODUCTION TO ADAPTIVE ARRAYS" John Wiley and Sons, 1980, pp 369–382 or as a Radar sidelobe canceller, see KRETCHMER F. F. and LEWIS B. L. "DIGITAL OPEN-LOOP SIDELOBE CANCELLER TECHNIQUES", NRL Report 8100 Apr. 6, 1977. An analogue implementation of this structure in the form of a Howells-Applebaum adaptive loop is described by GABRIEL W. F. "ADAPTIVE ARRAYS—AN INTRODUCTION" Proc. IEEE, Vol. 64, February 1976 pp 239 to 272.

Considering only narrowband signals, in which phase shift is a good approximation to time delay, the complex weights, w[r,c], at each of the nodes can be readily determined.

It is desired to find a weight w[r,c] such that $$\overline{v[r,c] + w[r,c] \cdot v[r,r] = v[r+1,c]}$$

is minimized. This quantity is minimized when $v[r,c] + w[r,c] \cdot v[r,r]$ is orthogonal to $v[r,r]$ (Papoulis A. "Probability, Random Variables and Stochastic Processes" McGRAW-HILL 1965); i.e. when $$\overline{v[r,c] \cdot v^*[r,r]} + w[r,c] \cdot \overline{v[r,r] \cdot v^*[r,r]} = 0$$

giving $$w[r,c] = -\overline{v^*[r,r] \cdot v[r,c]} / \overline{v^*[r,r] \cdot v[r,r]} \qquad (1)$$

where
  *denotes complex conjugate, and
  the overbar ——— denotes the expected value.

In polar notation; (to bring out the gain and phase terms explicitly)

$$w[r,c]\exp(\phi[r,c]) = \underbrace{(-a[r,c]/a[r,r])}_{\text{gain term}}\underbrace{\exp(\phi[r,c]-\phi(r,r))}_{\text{phase term}} \text{ where}$$

$$a[r,c]\exp(\phi[r,c]) = v[r,c]$$
$$a[r,r]\exp(\phi[r,r]) = v[r,r]$$
$$w[r,c]\exp(\phi[r,c]) = w[r,c]$$

If the operation of the orthogonalizers is examined in more detail, the principle of this algorithm will be more easily understood. If, for example, only one jammer (no signal) appears at the input to the array, then the output of the first row of orthogonalizers will be zero (except for uncorrelated noise). That is, the signal appearing at one antenna is simply a time shifted version of the signal appearing at the other antenna and hence is 100% correlated with it, thus it will be cancelled out. If the weights are now frozen and the output of each of the first row orthogonalizers is measured as a signal is moved around the 360 degrees of azimuth, then the resulting polar plots will each show a deep null in the direction of the jammer. In this particular case, when the signal is turned on (after the weights have been frozen, it will appear with no jammer, at the output of each of the first row orthogonalizers $v[2,2], v[2,3], \ldots v[2,n]$. (That is provided that the signal and jammer are not co-linear).

If 2 jammers were present then the output of the first row of orthogonalizers would no longer be zero. However, the output of the second row of orthogonalizers would be zero (except for noise) and, again with the weights frozen, a polar plot of the outputs of this row $v[3,3] \ldots v[3,n]$ would show each having 2 nulls, one for each jammer. Similarly with 3 jammers the output of the first or the second row of orthogonalizers would not be zero, but the output of the third row $v[4,4] \ldots v[4,n]$ would be zero except for noise, and with the weights frozen, the polar plot would have three nulls.

From the above it can be seen that if each row of the orthogonalizer is monitored as the orthogonalization process is taking place, then the row in which all of the jammers have been cancelled can be readily determined by comparing the row power levels with each other. Once this row has been determined, only the weights above that row will be frozen in this first phase of the process. With the desired signal absent the above operation is in effect comparing the power levels of the jammers with the power levels of the noise floor. If the jammer is not significantly greater than the noise floor then it will not significantly affect the desired signal and hence will be of little consequence if it is not nulled.

Figure 1:
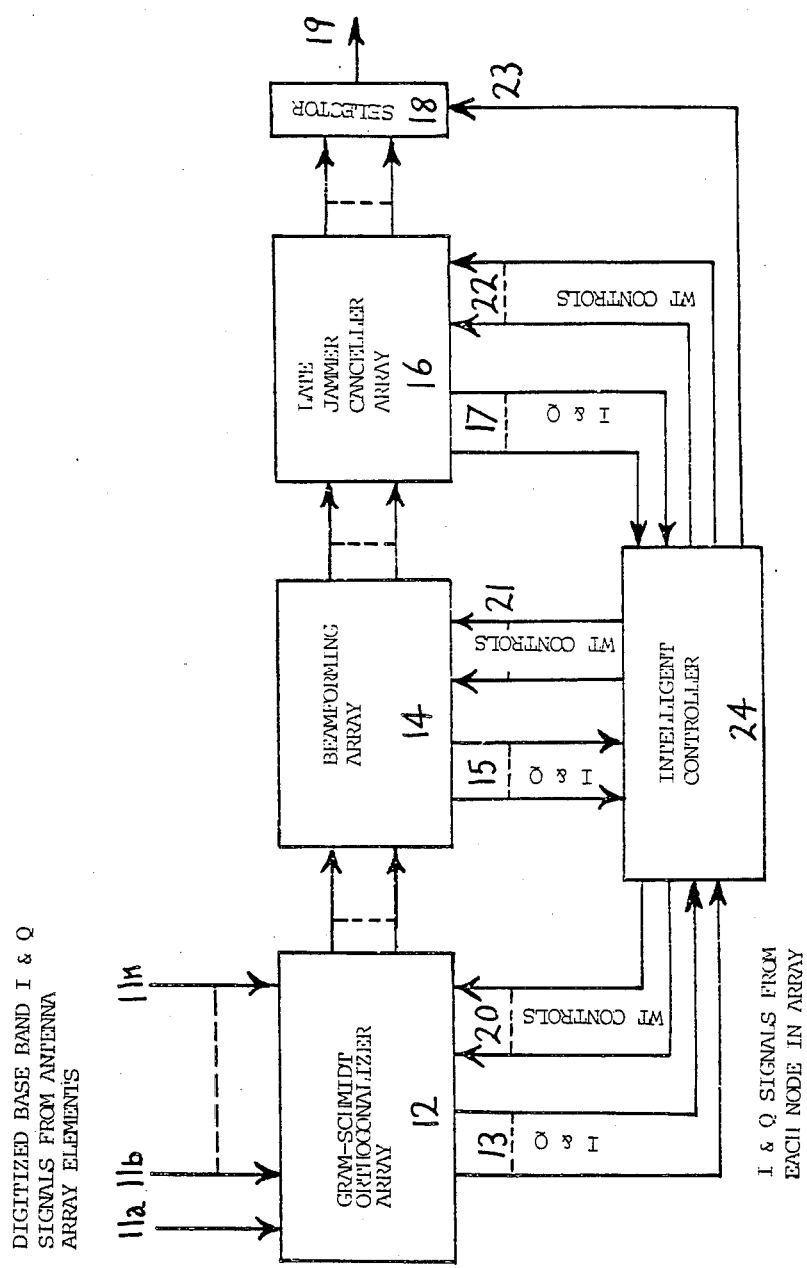

To determine the null depth which can be obtained in one data sample, consider a two element array having one jammer to contend with. The output of each of the I (in-phase) and Q (quadrature) channels for each antenna will contain jammer plus uncorrelated noise. Let;

$$v[1,1] = vj[1,1] + vn[1,1]$$

$$v[1,2] = vj[1,2] + vn[1,2]$$

be the outputs from antennas 1 and 2 due to the jammer (subscript j) and noise (subscript n). The output $v[2,2]$ see FIG. 1 is given by;

$$\begin{aligned} v[2,2] &= v[1,1] + w[1,1]\cdot v[1,2] \\ &= vj[1,1] + w[1,1]\cdot vj[1,2] + \\ &\quad vn[1,1] + w[1,1]\cdot vn[1,2] \\ &= 0 \text{ (when only one sample is used)} \end{aligned}$$

Therefore, for a weight based on one sample;

$$vj[(1,1] + w[1,1]\cdot vj[1,2] = -(vn[1,1] + w[1,1]\cdot vn[1,2])$$

Now if the instantaneous jammer voltage is much greater than the instantaneous value of the noise, which it is in the majority of cases, then the complex weight is a function of jammer position only and is independent of the jammer magnitude. Thus the residue, is independent of jammer magnitude. In fact the residue is simply equal to the instantaneous value of the array noise output, and the null depth is equal to the ratio of the instantaneous jammer power to the instantaneous array noise power at the time the sample was taken.

In the case of multiple, highly correlated jamming sources, optimum nulls will not be formed at this high speed. Normally samples must be taken over sufficient time so that the multiple interfering sources have time to de-correlate. If the weights are frozen before the sources have time to de-correlate, then these interferers will be removed in the third phase of this process as will be seen in the section on formation of further nulls.

BEAM FORMATION

If there are say "m" jammers and this is less than the number of degrees of freedom of the array, then each of the (m+1)th row voltages will contain no jammer, just signal (once it is turned on). These outputs can be phased with each other and added to form a beam in the direction of the desired signal.

Consider an "n" element array in which the row containing signal only is row "r", and $v[r,r]$ is taken as the reference signal. For beamforming, the phase of each of $v[r,r+1]$ to $v[r,n]$, will need to be changed at each node to be equal to the phase of $v[r,r]$. This beamforming circuitry is shown in FIG. 4. Note that in the normal orthogonalizer operation, it is the phase of $v[r,r]$ that is shifted at each node and not the phase of $v[r,c]$. In fact the phase of $v[r,r]$ is shifted to be exactly opposite to that of $v[r,c]$, while the amplitude is made exactly equal. It is not desirable to equalize the amplitude of the signals when beamforming. If one of the inputs to be summed has a null in the direction of the desired signal, then it will have a worse signal-to-noise ratio than the other input. Equalizing the amplitudes would cause the input with the worst signal-to-noise ratio to add proportionally more noise than the other input, which would degrade the resultant signal-to-noise. For this reason the beamforming weight will have unity gain and provide a phase shift only.

To beamform the signal of row "r" (considering phase only) it is desired to find a weight $\exp(\phi wb[r,c])$ such that:

$$\overline{\exp(\phi[r,r])} = \overline{\exp(\phi wb[r,c])\cdot \exp(\phi[r,c])}$$

or $$\exp(\phi wb[r,c]) = \overline{\exp(\phi[r,r] - \phi[r,c])} \qquad (4)$$

where exp ($\phi wb[r,c]$)=$wb[r,c]$, the beamforming weight
exp ($\phi[r,c]$) is the phase of the reference signal $v[r,r]$ exp ($\phi[r,c]$) is the phase of the signal $v[r,c]$ Note that the required phase shift given by (4) is exactly opposite the phase shift of the orthogonalizer weight given by (2), plus 180 degrees given by the minus sign of (2). Hence the beamforming weight $wb[r,c]$ can be determined from the orthogonalizer weight $w[r,c]$ as:

$$wb[r,c] = -w^*[r,c]/|w[r,c]| \qquad (5)$$

the output of the beamforming circuit of FIG. 3 will be:

$$vb[r] = v[r,r] + \sum_{i=r+1}^{n} wb[(r,i)] \cdot v[r,i] \qquad (6)$$

FORMATION OF FURTHER NULLS

As this process is more difficult to understand it will be treated as a specific case to aid understanding, and then treated in the generalized form.

Once the initial nulls have been formed and then a beam has been formed as discussed above, it is possible to form further nulls, providing that the initial nulls (not nulls plus beams) did not use up all of the degrees of freedom of the array. Consider the case of a 4 antenna array similar to FIG. 3 in which only 2 jammers appear during the initial period when the signal is absent. This will mean that the outputs of the third row ($v[3,3]$ and $v[3,4]$) will be zero (except for noise) when the weights of the first and second row are frozen. When the signal is turned on it will appear at both of these nodes without either jammer. If these signals are both fed into the next orthogonalizer block as indicated in the diagram, and the weights of this block are set (all other weights remaining frozen), then the output $v[4,4]$ will be zero. (i.e. the signal will be cancelled). Thus the signal must be taken from $v[3,3]$ and $v[3,4]$. By using the weight derived from this final orthogonalizer block ($w[3,4]$) conjugating, reversing, and normalizing it, as described by equation (5), a beam can be formed on the desired signal. If now a further jammer appears, it will appear at the [3,3] and [3,4] nodes along with signals, however it will also appear at node [4,4] with no signal. Thus a copy of this new jammer, alone with no other signal (except for noise), is available. If this new jammer appearing at node [4,4] is now orthogonalized with the composite beam formed signal $vb[3]$, a weight can be determined which will permit the jammer to be subtracted from the channel having desired signal plus jammer. Thus the new jammer may be removed from the output, leaving only signal plus noise. A schematic of this operation is shown in FIG. 5. Note that no reference signal is required to discriminate between the signal and the jammer, and this new jammer will be removed without removing the desired signal.

The complex weight required to remove a jammer from any output containing signal plus jammer, is derived in a similar manner to the weight required for orthogonalization. To cancel jammer "m" ($vj[m]$) from the k-th signal containing desired signal plus jammer ($vsj[m,k]$), it is desired to find a weight $wj[m,k]$ such that: $\overline{vsj[k] + wj[m,k] \cdot vj[m]}$ is minimised giving in a similar manner to (1)

$$wj[m,k] = -\overline{v^*j[m] \cdot vsj[k]}/\overline{v^*j[m] \cdot vj[m]} \qquad (7)$$

where
- $vsj[k]$ is the k-th output containing signal plus jammer
- $vj[m]$ is the output containing jammer "m" only
- $wj[m,k]$ is the weight required to cancel $vj[m]$ from $vsj[k]$ In the case considered above:
- $vj[3] = v[4,4]$ (considering this to be jammer #3)
- $vsj[3] = vb[3]$ (considering this to be the third output containing signal plus jammer)

and so $$wj[3,3] = \overline{v^*[4,4] \cdot vb[3]}/\overline{v^*[4,4] \cdot v[4,4]}$$

There are two cases to be considered for the generalized removal of further jammers. There is the case in which the jammers arrive so close together that there is insufficient time to perform the cancellation and removal of each jammer before the arrival of the next jammer, and there is the case in which the each further jammer is separated in time from the next jammer by an amount that will permit that jammer to be cancelled and removed from the signal before the next jammer arrives. Although the cancellation of the jammer takes only a few samples the removal of a jammer from a signal containing that jammer plus other signals takes many samples. (of the order of 100's of samples).

Consider now the first generalized case in which the number of elements in the array is "n", and the number of jammers appearing in the first phase of the algorithm (i.e. when the signal is absent) is "m". At the completion of this phase the jammers, $J[1] \ldots J[m]$, will have been nulled out. The first row containing no jammer will be row m+1. The next phase of the algorithm, when the signal appears, will cause the signal to be nulled out at row m+2 and a beam to be formed on the outputs of row m+1 (as occurred in the example above). If a further jammer, $J[m+1]$, now appears then it will appear at row m+2 without the signal. However if the weights at row m+2 are now adapted and then frozen, then this jammer will be nulled at row m+3 (recall that the nulling operation takes only a few data samples). And a further jammer $J[m+2]$ will appear at this row without any component of jammer $J[m+1]$. This can be nulled out in the following row, m+4. Clearly this process can be extended down the orthogonalizer tree until all rows are used up.

If these jammers all arrive one after the other then the last row containing jammers will contain one jammer only, the row above it will contain 2 jammers, and the row above that three jammers and so on, with one jammer being added for each row further up the tree. This last row which contains one jammer only, say row L, can be then cross correlated with all of the rows above (using equation (7)), and that jammer removed from each of these rows. A schematic of this process is illustrated in FIG. 6.

If there were no signal, the jammer appearing at row L would be jammer $J[L]$, however nulling the signal used up one row and, so the jammer appearing at row L will be jammer $J[L-1]$. Now that jammer $J[L-1]$ has been removed from row L−1 the output of row L−1 will now be simply jammer $J[L-2]$ which then can be substracted from all rows above. This process can, in theory, be extended right up the tree until all of the jammers have been removed from all of the rows above including the row containing the signal. It is not necessary to remove each jammer from all rows above in order to remove them all from the signal beamformer, however this method will permit each jammer to be brought out independently.

This process may be used to independently null multipath signals (provided that the path lengths differ by at least a few data bits so that each mode can be nulled before the next arrives).

This may have applications in the H.F. band, in which the multipath delays typically amount to may data bits. It appears that by using the technique described above that each different mode could be brought out independently.

Ideally all of the outputs within each row should be beamformed on the jammer appearing at that row, as this will provide the best jammer-to-noise ratio and will mean that less noise is added to the output when the jammer is subtracted from the signal beamformed output. In the majority of cases it would be expected that the jammer-to-noise ratio would be high and so the resultant improvement in jammer-to-noise brought about by beamforming would be small.

The case in which there is time to remove each jammer before the next arrives is relatively simple and is just an extension of the cancellation procedure of the first example above. That is, each beamformed jammer is successively removed from the beamformed signal as shown in FIG. 7. It is not necessary to remove each jammer from every other jammer first.

Although it appears that the implementation of this system requires a considerable amount of hardware in addition to the basic orthogonalizer, much of the hardware can be time shared as the different functions do not all occur at the same time, in fact they all occur one after the other. Firstly the initial nulls form, then the beam forms then the further nulls form.

COMPLETE SYSTEM

Figure 2:
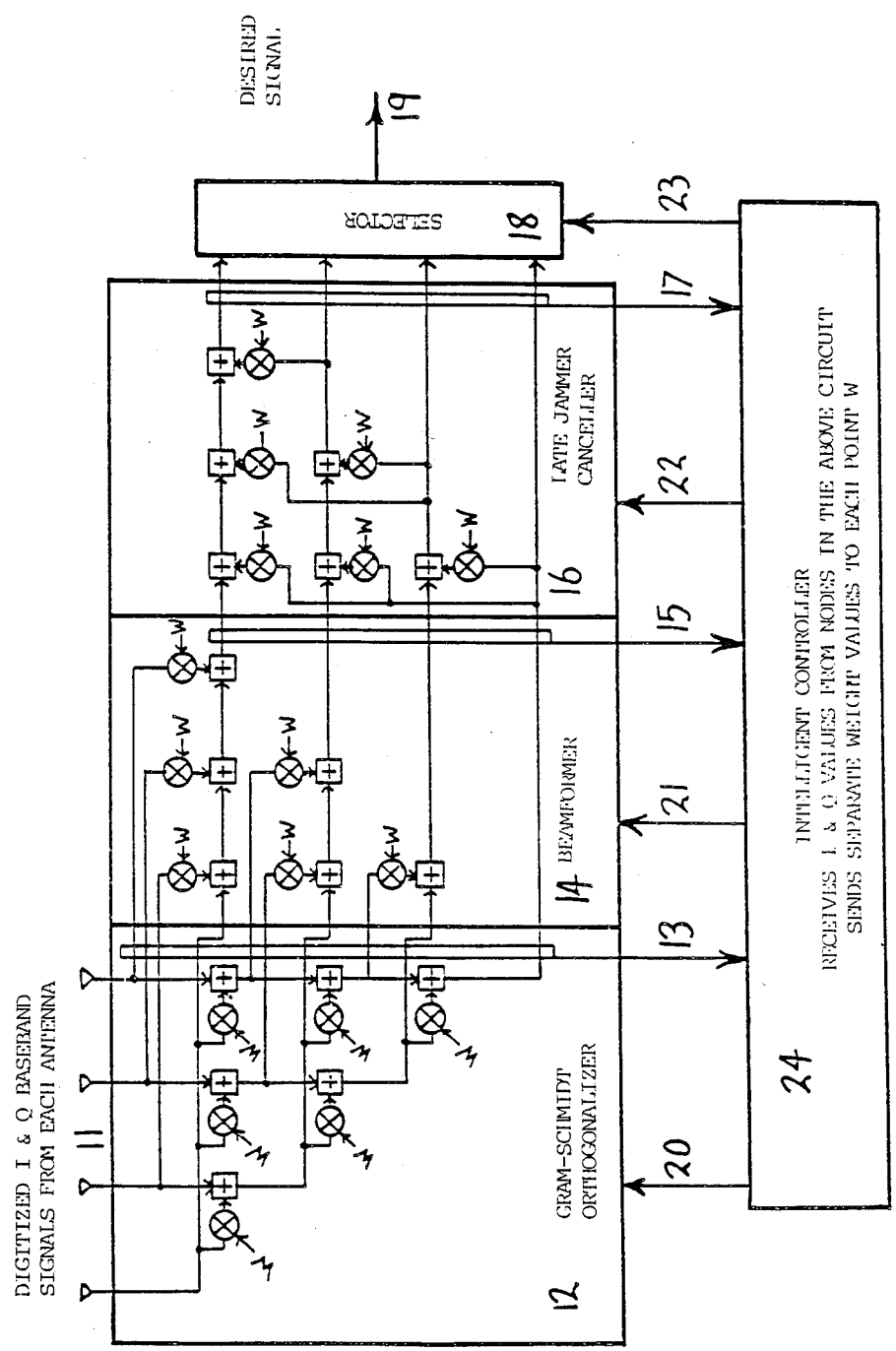

A schematic of the complete system showing the functional relationship between each of the three optimization processes is shown in FIGS. 1 and 2 in which the digitized base bands in phase and quadrature samples from each antenna element 11 are passed to the orthogonalizer array 12 and after being processed by that array are passed to the beamforming array 14 for further processing whence they are passed to the late jammer canceller 16 for final processing. The desired signal 19 is then selected by selector 18.

An intelligent controller 24 receives signals from nodes of each of the Gram-Schmidt orthogonalizer array 12, the beamform array 14, and the late jammer canceller array 16 via multiple channels 13, 15 and 17. These signals are used to determine the complex weights to be used in each orthogonalizer element and hence the configuration of the array. The weight values are passed from the intelligent controller 24 to: the Gram-Schmidt orthogonalizer array 12 via multiple channels 20, the beamform array 14 via multiple channels 21, the late jammer canceller via multiple channels 22 and the appropriate output control is passed to the selector 18 via 23.

SPEED OF OPERATION

Simulations indicate that with only 2 antennas and one jammer (with the signal absent), a one or two sample estimate of the correlation between two antennas will in general be sufficient to enable the appropriate complex weight to be determined which will reduce the jammer to within a few dB of the level of the uncorrelated noise floor. If the system is not critically signal-to-noise limited, this jammer reduction will permit adequate communications. Once the jammers have been eliminated a good estimate of the desired signal's correlation between antennas is obtained in one sample, and so a beam may be steered immediately, in fact simulations indicate that no improvement in beam forming is obtained by using more than one sample. Also no special (secure) reference is required to identify the signal as it should be the only correlated source present.

Although the case of more than two antennas and more than one jammer is less obvious to the intuition, simulations indicate that in N data samples, the number of nulls plus beams that can be formed with an array of N+1 antenna elements, is N. Each of these nulls has a depth of approximately the ratio of that jammer to the non-directional noise floor. For example a 4 element array can form 3 nulls, or 2 nulls and 1 beam in only 3 data samples!. Using one or two more samples than this minimum will yield an improvement, however the improvement by taking many more samples is not as significant.

The formation of further nulls when the desired signal is present is much slower than the formation of initial nulls which occurred with the desired signal absent. The number of samples required is a function of required signal-to-jammer, and as a first order approximation is independent of the un-nulled signal to jammer. This is because first sample reduces the jammer to the same level as the signal as shown in equation (3). From then on the number of samples required is a function of desired further reduction of jammer.

APPLICATIONS

This algorithm requires the receiver to know when the desired signal is absent. It is ideally suited to TDMA applications which have a guard time in which the receiver knows that the desired signal will be absent. A smart jammer may however force the system to randomize the transmitter "time out". It is also ideally suited to frequency hopping systems in which the receiver can look forward at the next hop frequency (which is unknown to the jammer) and null out any interference, particularly broad band jammers operating across a large portion of the band. (Once the hopper is hopping faster than a jammer can follow, the most serious threat is the broadband jammer). It should be kept in mind that this algorithm will adapt in only a few data bits and so will not occupy any significant portion of the hop duration for slow and medium speed hoppers.

In the case of a medium speed frequency hopping system in which only one data bit may be used form a null, it is the statistics of the number of adequately formed nulls that is the critical parameter. Simulations indicate that 98% of the time a sufficient S/(N+J) is achieved. This is a very satisfactory result, and will significantly improve the A/J capability of the system. This improvement will come at no cost to the data throughput in almost every case.

It is significant that his algorithm can null further jammers without loss of data once the initial weights have been frozen, even though there is no reference contained in the desired signal. This capability will negate the effects of pulse and "blinking" jammers.

The fact that each new jammer is nulled in the orthogonalizer (not necessarily removed from the signal) within a few samples of its appearance means that statistics of each non-continuous jammer can be kept by the intelligent controller and so a jammer may be quickly identified by a one or two sample estimate of its orthogonalization weight and then previous sample averages of this jammer's cross correlation can be used to remove this jammer from the desired signal. This is a particularly significant advantage of this algorithm which is brought about by partitioning the optimization problem. This capability is not available with other algorithms and architectures.

It should be pointed out that this system in which a short "time out" for the transmitter amounting to maybe a few percent of the total transmit time is required, is far more efficient than the conventional reference directed antenna array system in which traditiionally half the total transmit power is used for a "reference" for the adapt algorithm. As a consequence this system can be added to an existing communication system for a very small overhead in terms of lost throughput.

SIMULATION MODEL

The simulation model is spatially 3 dimensional, in which any number of antennas can be individually placed in any X, Y and Z coordinates. Any number of jammers may be present, originating from any azimuth and elevation. These jammers may be of the gaussian noise type or the biphase modulated type. One, biphase modulated, desired signal may be present and it may originate from any azimuth and elevation. An independent noise source is present on each antenna input to provide uncorrelated noise to the system.

FIG. 9 shows the typical response of a 4 antenna array with 3 jammers. In this case noise type jammers are present. It was found that by averaging over 3 to 4 samples the algorithm works well.

FIG. 10 illustrates the beam forming ability of this algorithm. In this case two nulls are formed in the first 4 data samples and one beam is formed in only 1 data sample. For this case the same 4 element antenna array as above is used. Only two jammers were present as this will leave one degree of freedom for the array to steer a beam.

Figure 11B:
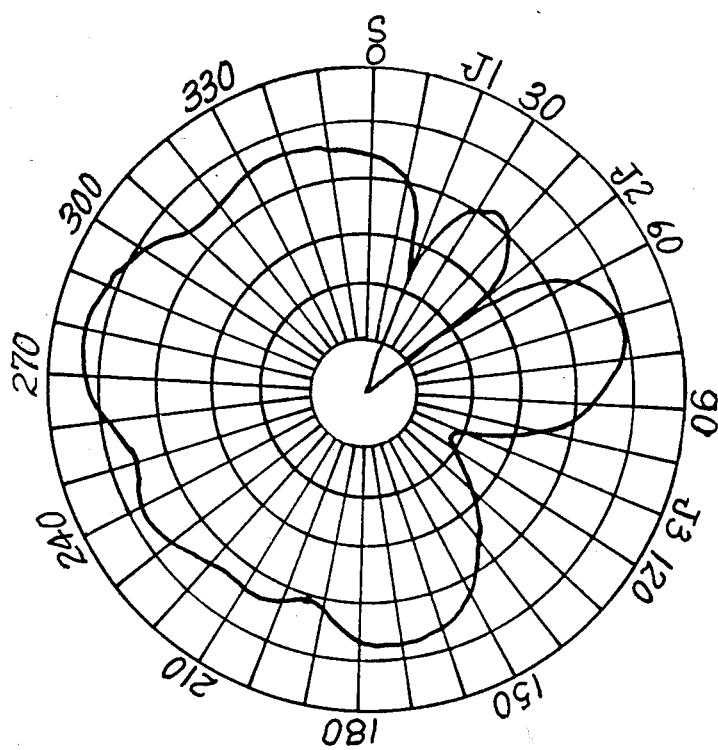

In FIG. 11a three jammers were used as in the above case with the exception that in the initial period when the signal was absent, only jammers 1 and 2 were turned on, this was followed by the beamforming operation, and then the third jammer was turned on. The array response, after 100 further samples are taken, is shown in FIG. 11b. This clearly shows the removal of this 'late' jammer.

CONCLUSIONS

The proposed architecture permits a controller to monitor many parameters and to partition the optimization problem. This results in a significant increase in the speed of formation of beams and nulls, and also permits the processor to null further jammers without nulling the desired signal, even though no reference is present at the time. It also permits the detection of sophisticated jamming techniques and speeds the application of appropriate countermeasures.

It has been shown that this algorithm can form nulls and beams at the rate of one beam or null per data sample. Taking one or two samples more than this absolute minimum will yield an improvement, however the rate of improvement decreases after this point.

The identification of the desired signal by having a "time out", when the desired signal is absent, is efficient in terms of power lost in the reference and is well suited to its application to existing systems.

The algorithm is ideally suited to TDMA and frequency hopping applications.

The realization of this algorithm, in terms of hardware, on one relatively simple building block which is repeated a number of times.

From the foregoing it will be realized that according to this invention the optimization process is partitioned into three distinct phases;
1. Null direction interference with signal absent
2. Null and then beamform on desired signal
3. Null any further jammers not present in phase 1.

As it has an intelligent controller which monitors the nodes of each row in the signal processing array, it is possible by comparing the signal levels at each row to determine the characteristics of the environment and optimally re-configure the processing array to match that environment.

The system provides a node at which all directional intereference jammers and the desired signal are cancelled, thus any additional jammers will appear at this node immediately, being uncorrupted by other signals. This facilitates the identification of these further jammers and their negation.

What is claimed is:

1. A method of removing undesired directional interference jammer signals from desired signals and maximizing a signal-to-noise ratio using an orthogonalizer array which includes processors to which digitized signals from a series of antennas are fed, comprising the sequential steps of:
   (a) determining a time when the desired signal is not present,
   (b) nulling the directional interference sources at said time the desired signal is not present, by adjusting weight values in said orthogonalizer array using an intelligent controller to which output signals of processors of said orthogonalizer array are applied, and using said weight value determined for each said processor of said orthogonalizer array,
   (c) freezing said weight values in the array above a null row, at which the jammers have been removed,
   (d) nulling said desired signal at a row below said null row,
   (e) beamforming on said desired signal at said null row during the presence of said desired signal after nulling said directional interference jammers,
   (f) freezing the weights in the beamformer and row below the null row, and
   (g) nulling any late directional interference jammers appearing on said beamforming desired signal.

2. The method of claim 1 wherein said nulling is effected by said orthogonalizer array and comprising the further steps of passing the signals processed by that array to a beamforming array,
   further processing said signals and passing them to a late jammer canceller,
   characterised in that the signals received from nodes of said orthogonalizer array and said beamforming array and said late canceller array are passed to the said intelligent controller through channels in which arrays of said weight values are determined and passed via channels to said orthogonalizer array and said beamforming array and said late canceller array, and selecting the desired signal by coupling an output selector with said intelligent controller to select the desired signal.

3. The method of claim 1 comprising the further steps of further submitting the derived digitized signals from each antenna output in the array to a Gram-Schmidt orthogonalizer array to orthogonalize the output of a first antenna with the output of each antenna in the row, then orthogonalizing the outputs of the first row orthogonalizer with the outputs of the orthogonalizers of each row to have all outputs orthogonal to each other, passing the output of each row to the intelligent controller connected to receive the output signals from the orthogonalizer array and to adjust the weight value in the orthogonalizer array, said intelligent controller also receiving the outputs of each row of the beamformer array and a later jammer canceller connected to receive the processed signals from the said beamformer array, said intelligent controller being connected to adjust the weights in said beamformer array and late jammer canceller and the selector via channels to output the desired signal, whereby to permit selection of the row at which the nulling operation stops, the row at which the desired signal is beamformed on, and to determine the presence and the null further jammers.

4. The method of claim 2 characterised in that the said intelligent controller is arranged to monitor the nodes in each row in the orthogonalizer array and to compare the signal levels at each row to determine environmental characteristics and optionally re-configuring the said array to match the said environment.

5. The method of claim 2 characterised in that the said signals passed to the said intelligent controller from the nodes of the said orthogonalizer array and the said beamforming array and the said late jammer canceller are in-phase and quadrature signals.

6. The method of claim 2 characterised in that the said signals passed to the said intelligent controller from the nodes of the said orthogonalizer array and the said beamforming array and the said late jammer canceller are obtained by use of tapped delay lines.

7. A method as in claim 1 wherein said nulling any late jammer step comprises the further steps of:
nulling said desired signal;
determining the presence of any late directional interference jammer in a channel where said and desired signal has been nulled; and
nulling said late directional interference jammers.

8. A method as in claim 1 comprising the further step of delaying said beamforming on said desired signal step by an amount of time to allow said adjusting weight values step to be completed.

9. A device for removing undesired jammer signals in an adaptive antenna array system, comprising:
initial interference cancelling means for receiving a desired signal from the adaptive antenna array, including an orthogonalizer array coupled to receive digitized signals from said antenna array, for determining an initial interference during an initial time when said desired signal is not present and for cancelling said initial interference;
a beamforming array coupled to said initial interference cancelling means, for receiving said desired signal with said interference cancelled and beamforming said signal;
a late jammer canceller array;
each said array comprising rows of orthogonal processors within rows of each array coupled to the rows of an adjacent array;
an intelligent controller coupled to receive signals from each processor of each said array; and
a selector under control of the intelligent controller, arranged to select a row having the desired beamformed signal.

10. An apparatus as in claim 9 wherein said beamforming array includes means for beamforming a signal by adding a weight that is in-phase with said signal and means for nulling said signal by adding a weight which is out-of-phase with said signal, wherein said intelligent controller includes means for processing said nulled signal to determine the presence of any late jammers, and means for commanding said late jammer canceller array to cancel out said late jammers so detected.

11. An apparatus as in claim 10 further comprising means for delaying said beamforming array from beamforming said signal by an amount of time sufficient to calculate respective weights for the respective signals.

12. An apparatus as in claim 9 wherein said initial interference cancelling means includes means for determining weights to cancel out said initial interference and means for freezing said weights after said initial time.

13. An apparatus as in claim 12 further comprising means for delaying said beamforming array from beamforming said signal by an amount of time sufficient to calculate respective weights for the respective signals.

14. An apparatus for removing undesired jammer signals from desired signals and to maximize the signal-to-noise ratio by forming a beam on a desired signal in adaptive antenna arrays in which rows of orthogonal processors receive digitized signals from each antenna in the array, comprising:
(a) an orthogonalizer array comprising rows of orthogonal processors for cancelling directional interference signals at a first time when the desired signal is not present,
(b) a beamforming array comprising rows of processors arranged to receive antenna signals and to receive the outputs of the rows of orthogonal processors and to beamform on the desired signal which has had said directional interference signals cancelled by said orthogonalizer array,
(c) a late jammer canceller array having rows of processors for receiving beamformed signals from said beamforming array and for cancelling jammer signals that were not present at said first time during the cancelling in said orthogonalizer array,
(d) intelligent controller means for receiving the signals from nodes of each of said processors of all of the arrays and for determining weight values for each processor of said arrays and applying the weight values to said processors in said arrays, and
(e) an output selector coupled to receive signals from said late jammer canceller array, and for selecting the desired beamformed signal under control of said intelligent controller.

15. The apparatus of claim 14 wherein there are a plurality of antennas, and further comprising:
means for submitting the digitized signals from each antenna in the array to said orthogonalizer array to orthogonalize the output of a first antenna with the output of each other antenna in the row, and
circuit means for orthogonalizing the outputs of first row orthogonalizers with the outputs of the orthogonalizers of each row to render all outputs orthogonal to each other, and for passing the output of each row to the intelligent controller means to receive the output signals from the orthogonalizer array and to adjust the weights in the orthogonalizer array.

16. The apparatus of claim 15 wherein said circuit means is also for transmitting the outputs of each row of said orthogonalizer array to said beamforming array and of said late jammer canceller to said intelligent controller means, said intelligent controller means being connected to adjust the weights in said orthogonalizer array and said beamforming array, and to late jammer canceller and selector to output the desired beamformed signal, whereby to permit selection of the row at which the nulling operation stops, the row at which the desired signal is beamformed on, and to determine the presence and to null further interference, said orthogonalizer array having the outputs of the rows coupled to the corresponding rows of said beamformer array and said beamformer array having the outputs of the rows coupled to the corresponding rows of said further jammer array whereby the nulling is first effected, then the beamforming, and then the nulling of further jammer signals.

17. An apparatus as in claim 14 further comprising means for delaying said beamforming array from beamforming said desired signal for amount of time necessary for said intelligent controller means to determine said weight values and to apply said weight values to said processors in said array.

18. An apparatus as in claim 14 further comprising means for freezing those of said weight values which cancel said directional interference signals at said first time.

* * * * *